United States Patent Office 2,816,495
Patented Dec. 17, 1957

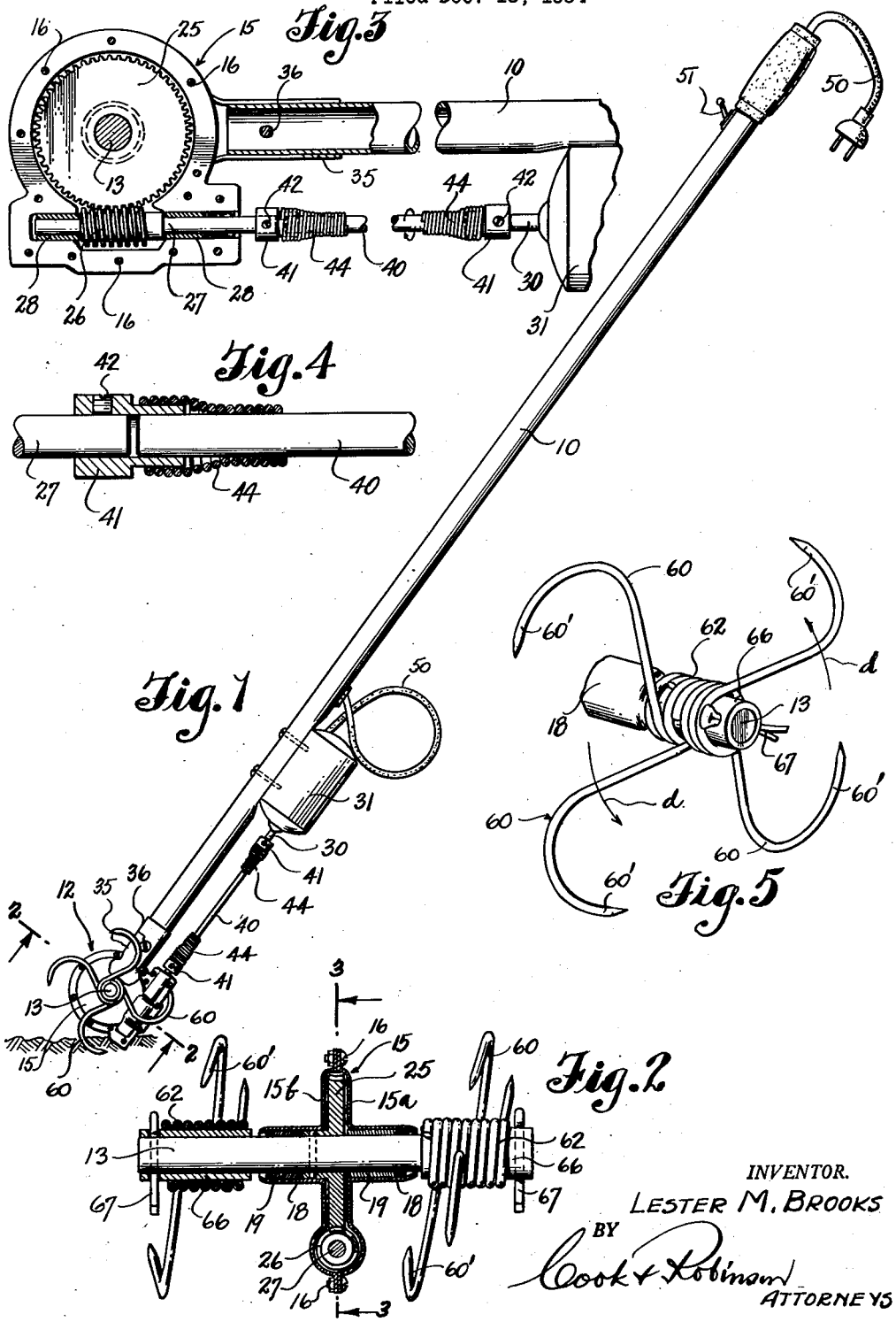

2,816,495

GROUND CULTIVATOR

Lester M. Brooks, Seattle, Wash.

Application December 13, 1954, Serial No. 474,931

2 Claims. (Cl. 97—40)

This invention relates to soil or ground cultivators and it has reference more particularly to cultivators designed for the cultivation of small gardens and for relatively light work as distinguished from cultivators of large size as used for field cultivation.

It is the principal object of the present invention to provide a light weight, motorized cultivator, adapted to be held and manipulated by the hands. Furthermore, to provide a cultivator having a handle portion that is similar to and adapted to be held by the hands in the manner of holding the handle of a hoe in the normal use of the hoe, and which handle is equipped at its lower end with a motor driven cross-shaft on which ground cultivating teeth are functionally mounted.

It is a further object of the present invention to provide a cultivator of the character above stated wherein the driving motor is fixed to the handle and has a novel driving connection with said cross-shaft which eliminates the necessity for the usual exactness in alignment of parts in making such a driving connection.

Still further objects and advantages of the invention reside in the details of construction of the various parts embodied in the cultivator; in their assembled relationship, and in the manner of use of the device, as will hereinafter be fully described.

In accomplishing these and other objects of the invention, I have provided the improved details of construction, the preferred forms of which are illustrated in the accompanying drawings, wherein:

Fig. 1 is a side view of a cultivator embodying the improvements of the present invention therein.

Fig. 2 is an enlarged cross-section, taken along the line 2—2 in Fig. 1, showing the worm gear and worm for driving the cultivator shaft and ground working elements mounted thereon.

Fig. 3 is a longitudinal section taken substantially on line 3—3 in Fig. 2, showing the flexible driving connection between motor shaft and worm.

Fig. 4 is a sectional detail of the flexible connection between motor and worm.

Fig. 5 is a perspective view showing the cultivator tines and the means for and manner of mounting them on the motor driven cross-shaft.

Referring more in detail to the drawings:

The present tool is especially designed for holding by the hands of a user for its various purposes after the fashion of holding an ordinary garden hoe for use. In its preferred form of construction, it comprises a straight handle portion 10 which, at its lower end, carries a ground cultivating tool which, in Fig. 1, is designated in its entirety by reference numeral 12. This tool comprises a horizontal cross-shaft 13 that is revolubly supported by a gear housing 15 mounted on the lower end of the handle 10, as presently explained in detail.

It is shown in Fig. 2 that the gear housing 15 comprises complemental opposite side plates, 15a and 15b, so shaped and joined that together they provide a circular gear enclosure. They are joined in their assembled relationship in which they are shown by a plurality of screw bolts 16 applied at regular spaced intervals through registering openings on their peripheral portions as shown in Figs. 2 and 3. Directed outwardly from the two plates 15a and 15b, in axial alignment, are tubular hub portions 18—18, containing suitable sleeve bearings 19—19 wherein the cross-shaft 13 is revolubly mounted.

Opposite end portions of the cross-shaft 13 extend beyond the outer ends of the hub portions 18—18 for the mounting of cultivator tines or the like thereon, as presently explained.

Fixed on the cross-shaft 13, within the housing 15, is a worm gear 25, and in driving mesh therewith is a worm 26 on a worm shaft 27. The worm shaft lies in the plane of gear wheel 25, parallel to the axial line of the handle 10. It is rotatably contained, beyond the opposite ends of the worms 26, in bearings 28—28 that are seated in the housing 15 between the opposite side plates 15a—15b as best shown in Fig. 3. One end of shaft 27 extends from the housing 15 for connection with the drive shaft 30 of an electric motor 31 that is fixed to the handle 10 as shown in Fig. 1.

For the mounting of the gear housing 15 on the end of handle 10, a tubular socket 35 is fixed by welding or other suitable means to the housing to extend radially therefrom. The socket contains the lower end portion of the handle 10 therein and the handle is secured in the socket by a bolt 36 that is applied through the parts, as shown in Fig. 3.

The electric motor 31 is secured to the underside of the handle 10 a short distance from the housing 15, with its drive shaft parallel to the axis of the handle. The worm shaft 27 is operatively joined to the motor shaft 30 through the mediacy of a connecting shaft 40. Shaft 40 is fitted loosely at its opposite ends in tubular couplings 41—41 which, respectively, are fitted tightly to the ends of shafts 27 and 30 and held by set screws 42, as best shown in Fig. 4. Coiled springs 44—44 have end portions applied tightly about the end portions of the couplings and connecting shaft, thus providing a flexible driving connection. The direction of winding the spring coils 44 is such that friction of the driving member operates to cause the springs to become more tightly wound on the parts which they join and normally hold against slippage.

Electric current for the motor 31 is supplied through circuit wires contained in a cord 50 that leads to the motor through the tubular handle 10. The connection includes a circuit control switch 51 mounted on the handle near its outer end. Whenever the motor is energized upon closing the switch, it operates through the connections previously described, to drive the cross-shaft 13 and cultivator teeth mounted thereon in the direction indicated by the arrow d in Fig. 5.

The cultivator teeth, or tines, are preferably as shown at 60 in Figs. 1 and 5, each comprising a single length of stiff spring wire, of suitable gauge, bent to provide it with an outer end hook 60' which points toward the direction of rotation. At its inner end, each wire is formed into a coil 62 of two or more convolutions. The present cultivator is shown, in Fig. 2, to mount four teeth on each of the opposite end portions of the cross-shaft 13. The four teeth, at each end of the cross-shaft, have the coil portions thereof fitted to a cylindrical sleeve 66 that is applied over the corresponding shaft end, and secured against relative turning thereon by cotter key 67, as shown in Fig. 2, that is applied through the sleeve and shaft. The direction of winding of the coil portions 62 at the inner ends of the teeth is such that the coils will automatically tighten on the sleeves 66 incident to operation of the cultivator teeth in the ground.

The device, so constructed, can be used effectively for ground cultivation. It is especially useful for cultivation under bushes or overhanging plants. It can be caused to operate to substantial depth merely by holding it against forward travel. In fact, the depth of its operation can be regulated by controlling its rate of advancement along the ground.

Devices of this kind are light in weight, easy to handle and manipulate and are comparatively inexpensive.

It is further anticipated that the cultivator teeth can be removed from the shaft ends for replacement by tools of other kind. For example, a cutter of serrated disk form could be applied for grass-trimming purposes.

For a better understanding of the character of the present device, as now being manufactured, it will be here further explained that it has a weight of approximately five pounds. The tilling width as provided by the cross-shaft is from six to twelve inches, and the tilling depth is up to six inches.

The term "cultivate" as used in connection with this invention includes such operations as tilling and mulching, which can be easily accomplished even in the bottom of a trench or hole. It includes also, the mixing of compost, or fertilizer; the stirring of poultry litter; work in green house beds, around flowers, shrubbery borders, and numerous other jobs that are incident to gardening.

Having thus described my invention, what I claim as new therein and desire to secure by Letters Patent is:

1. A device of the character described comprising a gear housing, a cross-shaft rotatably mounted in said housing with its opposite end portions extended from the opposite sides thereof, ground cultivating means mounted on the extended end portions of the cross-shaft, a driving worm gear fixed on cross-shaft within said housing, a handle fixed rigidly to the housing and extended therefrom in a direction radially of the cross-shaft; said handle being of substantial length for the hand manipulation and control of the device, an electric motor mounted on the handle near its lower end with its drive shaft substantially parallel thereto and extended toward the gear housing, a worm shaft mounted in said housing and extended therefrom in axial alignment with the motor shaft, a worm on said worm shaft in driving mesh with the worm gear, and a connecting shaft extended between the ends of the motor shaft and worm shaft and joined therewith at its ends through the mediacy of flexible couplings; each of which couplings comprises a tubular collar with one end portion thereof fitted to and revolubly containing the adjacent end of said connecting shaft therein, and having its other end portion fitted to and secured against turning on the end of one of the aligned shafts, and a helically wound spring wire coil fitted at its ends about the adjacent end portions of the collar and connecting shaft for automatic tightening under the driving influence of the motor shaft.

2. A device as recited in claim 1 wherein the said ground cultivating means as applied to each of the opposite end portions of the cross-shaft comprises a tubular sleeve that is fitted to the shaft end and removably pinned thereto, and a plurality of tines arranged in succession therealong, each tine being angularly advanced relative to the one adjacent thereto comprising a single length of stiff spring wire, formed at its outer end with a hook-like portion that is forwardly directed in respect to direction of rotation, and at its inner end is formed with a helical coil that is fitted to said sleeve, and which coil is wound in such direction that it automatically tightens under the driving influence of the cross-shaft.

References Cited in the file of this patent

UNITED STATES PATENTS

| | | |
|---|---|---|
| 2,366,624 | Kelsey | Jan. 2, 1945 |
| 2,575,012 | Harvey | Nov. 13, 1951 |
| 2,699,605 | Selter | Jan. 18, 1955 |
| 2,751,833 | Hupp | June 26, 1956 |

FOREIGN PATENTS

| | | |
|---|---|---|
| 194,113 | Switzerland | Feb. 1, 1938 |